(12) United States Patent
Ishimoto

(10) Patent No.: US 8,020,947 B2
(45) Date of Patent: Sep. 20, 2011

(54) VEHICLE TURNING MOTION CONTROL

(75) Inventor: Takeshi Ishimoto, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 9 days.

(21) Appl. No.: 11/143,573

(22) Filed: Jun. 3, 2005

(65) Prior Publication Data

US 2005/0269874 A1 Dec. 8, 2005

(30) Foreign Application Priority Data

Jun. 7, 2004 (JP) ................................. 2004-167915

(51) Int. Cl.
*B60T 8/24* (2006.01)
(52) U.S. Cl. ........................... 303/140; 303/146; 701/72
(58) Field of Classification Search .................. 303/140, 303/141, 142, 146, 155; 701/140, 141, 142, 701/146

See application file for complete search history.

(56) References Cited

U.S. PATENT DOCUMENTS

| | | | | |
|---|---|---|---|---|
| 5,206,808 A * | 4/1993 | Inoue et al. | ...................... | 701/72 |
| 5,315,295 A | 5/1994 | Fujii | | |
| 5,645,326 A * | 7/1997 | Sano | ............................. | 303/146 |
| 6,208,927 B1 | 3/2001 | Mine et al. | | |
| 6,212,460 B1 * | 4/2001 | Rizzo et al. | ...................... | 701/70 |
| 6,212,465 B1 | 4/2001 | Sielagoski et al. | | |
| 6,219,610 B1 * | 4/2001 | Araki | ............................. | 701/72 |
| 6,424,904 B1 * | 7/2002 | Takahashi et al. | .............. | 701/70 |
| 6,453,226 B1 * | 9/2002 | Hac et al. | ......................... | 701/48 |
| 6,526,344 B2 | 2/2003 | Tamura et al. | | |
| 6,539,298 B2 * | 3/2003 | Inagaki et al. | .................. | 701/70 |
| 6,564,138 B1 | 5/2003 | Schmitt et al. | | |
| 6,604,042 B2 | 8/2003 | Maruko et al. | | |
| 6,654,674 B2 * | 11/2003 | Lu et al. | ........................... | 701/36 |
| 6,910,746 B2 * | 6/2005 | Kato et al. | ..................... | 303/140 |
| 7,252,346 B2 * | 8/2007 | Higuchi | ........................ | 303/146 |
| 7,419,229 B2 * | 9/2008 | Higuchi et al. | ............... | 303/155 |
| 7,463,963 B2 * | 12/2008 | Higuchi | ........................... | 701/70 |
| 7,593,800 B2 * | 9/2009 | Higuchi | ........................... | 701/70 |
| 7,805,234 B2 * | 9/2010 | Ishimoto | ......................... | 701/72 |
| 2001/0005101 A1 * | 6/2001 | Matsuno | ........................ | 303/146 |
| 2003/0163238 A1 | 8/2003 | Matsumoto et al. | | |
| 2005/0269874 A1 * | 12/2005 | Ishimoto | ........................ | 303/146 |

FOREIGN PATENT DOCUMENTS

| | | |
|---|---|---|
| DE | 101 19 907 A1 | 10/2002 |
| JP | 05-016699 A | 1/1993 |
| JP | 2600876 B2 | 1/1997 |
| JP | 9-301147 A | 11/1997 |

(Continued)

OTHER PUBLICATIONS

U.S. Appl. No. 11/138,312, filed May 27, 2005, Higuchi.

(Continued)

*Primary Examiner* — Bradley King
*Assistant Examiner* — Thomas Irvin
(74) *Attorney, Agent, or Firm* — Foley & Lardner LLP

(57) ABSTRACT

A vehicle turning motion control apparatus includes a turning condition sensing section to sense a turning condition of the vehicle; and a vehicle deceleration control section to initiate a deceleration control to decelerate the vehicle when the turning condition exceeds a deceleration start threshold. The control apparatus further includes a running state sensing section configured to sense a running state of the vehicle, and a threshold setting section configured to set the deceleration start threshold in accordance with the running condition.

14 Claims, 8 Drawing Sheets

FOREIGN PATENT DOCUMENTS

| | | |
|---|---|---|
| JP | 11-83501 A | 3/1999 |
| JP | 2001-233190 A | 8/2001 |
| JP | 2002-205630 A | 7/2002 |
| JP | 2003-205830 A | 7/2003 |
| JP | 2004-017710 A | 1/2004 |

OTHER PUBLICATIONS

U.S. Appl. No. 11/144,610, filed Jun. 6, 2005, Higuchi et al.

* cited by examiner

AUTO BRAKE ACTUATION FLAG

PRELIMINARY PRESSURE INCREASE FLAG

VEHICLE BODY SPEED V

BRAKE PRESSURE

VEHICLE TURNING MOTION CONTROL

BACKGROUND OF THE INVENTION

The present invention relates to apparatus and/or process for controlling motion of a vehicle.

A Japanese patent 2600876 (JP-A-H02-171373) shows a vehicle control system for producing a braking force automatically when a vehicle turning condition approaches a limit of a stable cornering performance range.

SUMMARY OF THE INVENTION

The vehicle control system can maintain the stability of the vehicle by decelerating the vehicle automatically when the vehicle speed is too high to negotiate a corner. However, in some cases, the control system may be insufficient in control response speed to start increasing the braking force especially in the case of a hydraulic brake system using a motor pump. It is therefore an object of the present invention to provide vehicle control apparatus and/or process for effecting an automatic deceleration quickly.

According to one aspect of the present invention, a vehicle turning motion control apparatus for a vehicle. comprises: (1) a turning condition sensing section configured to sense a turning condition of the vehicle; (2) a vehicle deceleration control section configured to initiate a deceleration control to decelerate the vehicle when the turning condition surpasses a deceleration start threshold; (3) a running state sensing configured to sense a running state of the vehicle; and (4) a threshold setting section configured to set the deceleration start threshold in accordance with the running condition.

According to another aspect of the invention, a vehicle turning motion control apparatus comprises: an actuator section to decelerate the vehicle in an automatic deceleration control; a sensor section to sense vehicle operating conditions of the vehicle, and to provide input information on the vehicle operating condition; and a controller to calculate, from the input information supplied from the sensor section, a first turning motion variable representing an actual turning radius of the vehicle and a second turning motion variable representing an actual turning speed of the vehicle; to determine an automatic deceleration control start timing in accordance with the first and second turning motion variables; to initiate the automatic deceleration control to decelerate the vehicle with the actuator section at the automatic deceleration start timing. In this control apparatus, the controller is further configured to calculate a parameter representing a speed of turning motion of the vehicle, from the input information supplied from the sensor section, and to advance the automatic deceleration start timing when the parameter is greater than a predetermined value.

According to still another aspect of the present invention, a vehicle turning motion control process comprises: (1) sensing a turning condition of the vehicle; (2) decelerating the vehicle by initiating a deceleration control when the turning condition surpasses a deceleration start threshold; (3) sensing a running state of the vehicle; and (4) setting the deceleration start threshold in accordance with the running state.

According to still another aspect of the present invention, a vehicle turning motion control apparatus comprises: means for sensing a turning condition of the vehicle; means for comparing the turning condition with a deceleration start threshold, and initiating a deceleration control to decelerate the vehicle automatically when the turning condition surpasses the deceleration start threshold; means for sensing a running state of the vehicle; and means for setting the deceleration start threshold in accordance with the running state.

DETAILED DESCRIPTION OF THE INVENTION

Figure 1:
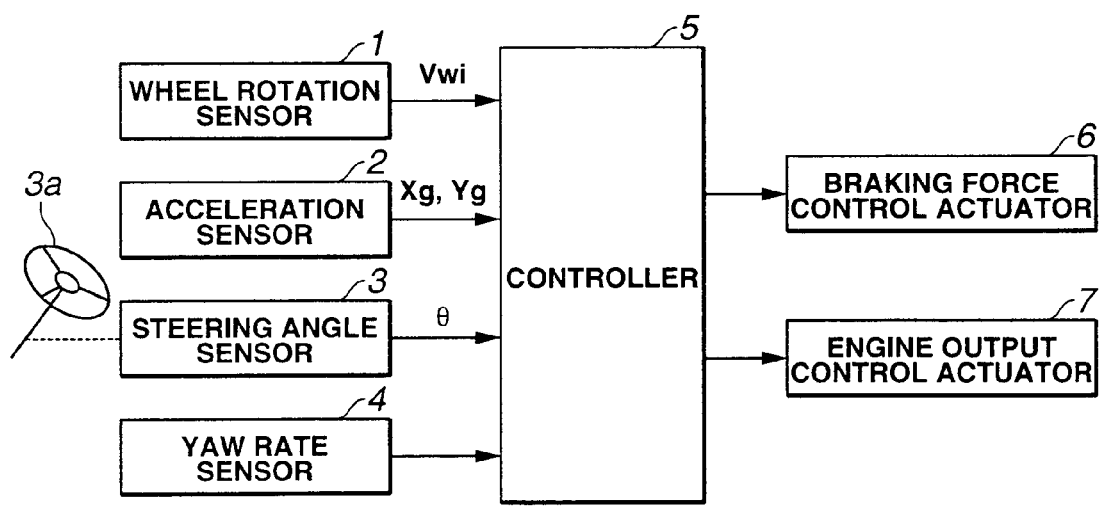
FIG. 1 is a block diagram showing a vehicle turning motion control system or apparatus according to a first embodiment of the present invention.

FIG. 1 shows, in a block diagram, a vehicle turning (or cornering) motion control system or apparatus according to a first embodiment of the present invention. A wheel rotation sensor (or wheel speed sensor) 1 is a group of sensing devices of electromagnetic induction type for sensing wheel speeds Vwi (i=FL~RR) of the front and rear wheels of a vehicle, respectively. An acceleration sensor 2 includes one or more sensing devices for sensing a longitudinal acceleration Xg and a lateral acceleration Yg of the vehicle, by using a mercury switch, for example. A steering angle sensor 3 of an optical, non-contact type senses a steering angle θ of a steering wheel 3a of the vehicle. A yaw rate sensor 4 senses a yaw rate φ of the vehicle. A sensor section including these sensors is connected with a controller 5 which includes a microcomputer in this example. Input information collected by the sensor section is supplied to controller 5.

Figure 3:
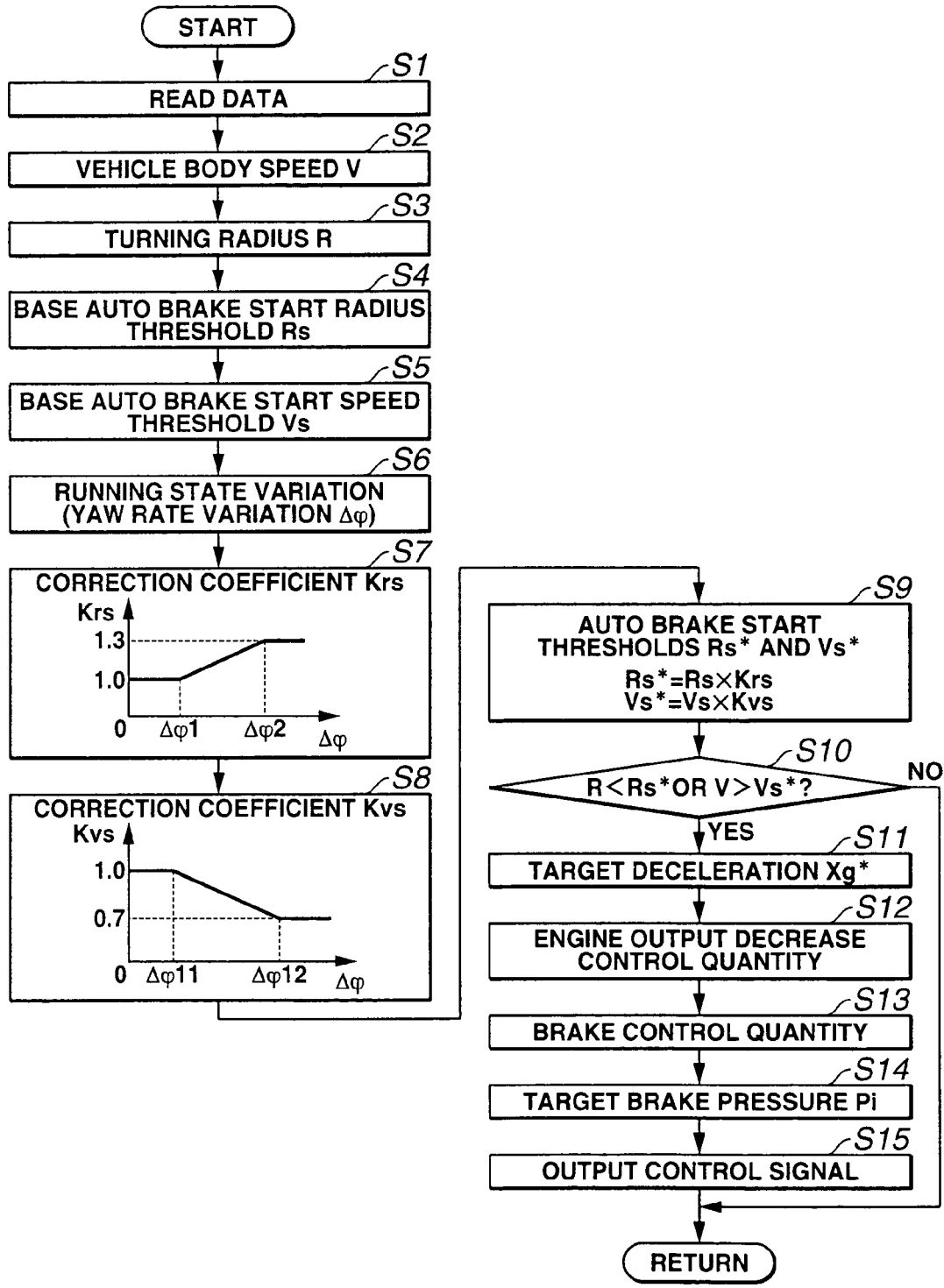
FIG. 3 is a flowchart showing a vehicle turning motion control process performed by a controller of the control system shown in FIG. 1.

Controller 5 performs a vehicle turning motion control process (as shown in FIG. 3) by using the signals supplied from the sensors, and thereby controls an actuating section which, in this example, includes a braking force control actuator 6 and an engine output control actuator 7 to perform an automatic deceleration control in accordance with a vehicle turning condition. Engine output control actuator 7 of this example is arranged to control the engine output by regulating the opening degree of a throttle valve.

Figure 2:
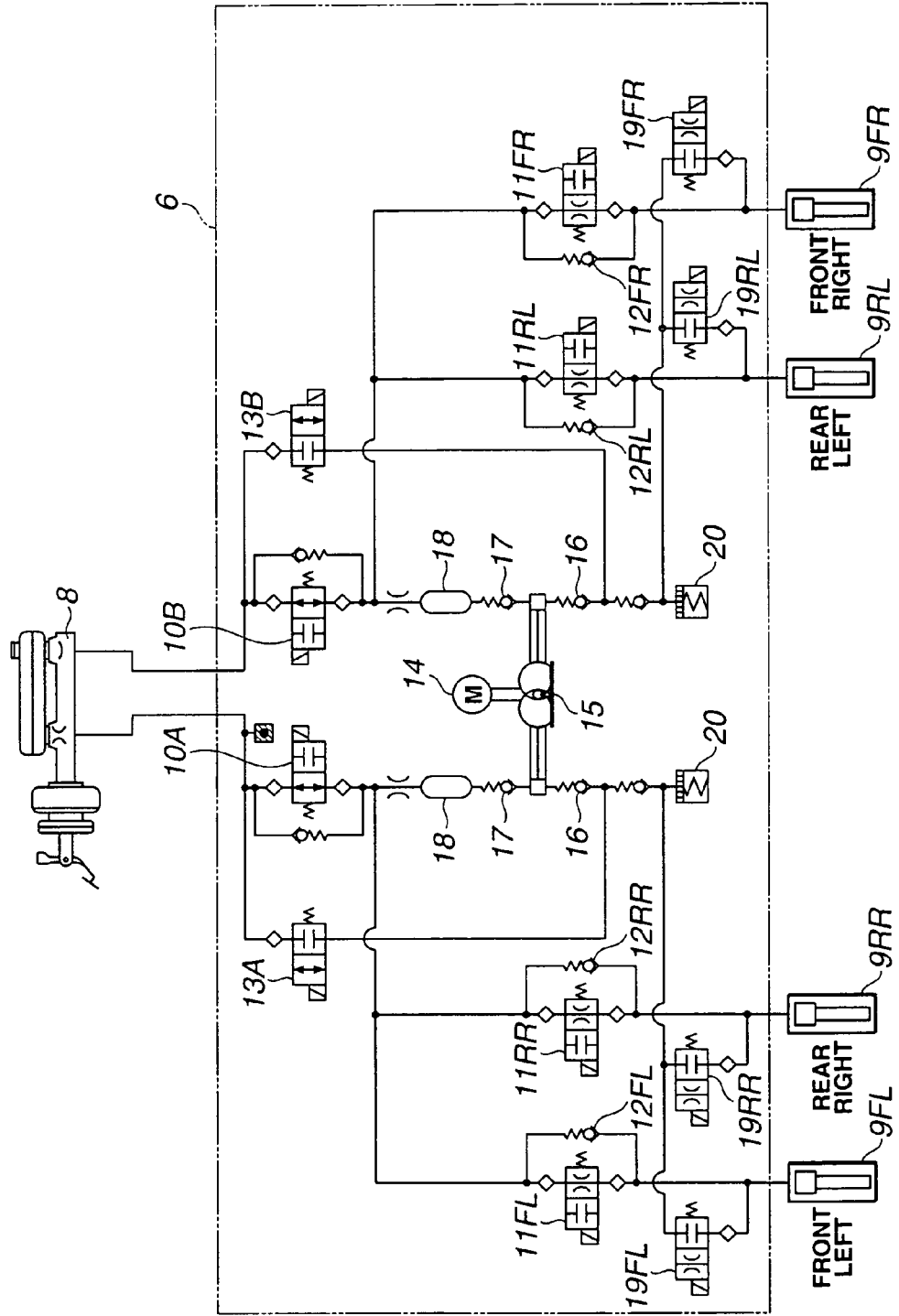
FIG. 2 is a hydraulic circuit diagram showing a braking force control actuator of the control system of FIG. 1.

Braking force control actuator 6 of this example is an actuating system utilizing a hydraulic brake fluid pressure control circuit which can be used for antiskid brake control (ABS), traction control (TCS) and stability control (VDC). As shown in FIG. 2, the pressure control circuit of this example is connected between a master cylinder 8 and a wheel cylinder group 9i, and arranged to control the brake fluid pressure of each wheel cylinder 9i in a pressure increase mode, a pressure hold mode and a pressure decrease mode, without regard to a driver's brake operation.

As shown in FIG. 2, master cylinder 8 is connected through a normally-open type selector valve 10A, and normally-open type inlet solenoid valves 11FL and 11RR, with a front left wheel cylinder 9FL and a rear right wheel cylinder 9RR in a first (left) half circuit section; and further connected through a normally-open type selector valve 10B, and normally-open type inlet solenoid valves 11FR and 11RL, with a front right wheel cylinder 9FR and a rear left wheel cylinder 9RL in a second (right) half circuit section.

Each inlet solenoid valve 11$i$ is provided with a return check valve 12$i$ for returning a brake fluid pressure from the corresponding wheel cylinder 9$i$ to master cylinder 8, bypassing an orifice at the time of brake cancellation. Moreover, master cylinder 8 is connected through a normally-closed type selector valve 13A, with a downstream side (wheel cylinder's side) of selector valve 10A; and further connected through a normally-closed type selector valve 13B, with a downstream side (wheel cylinder's side) of selector valve 10B. A common pump 15 is driven by an electric motor 14. Pump 15 includes a first portion provided between selector valves 10A and 13B, and a second portion provided between selector valves 10B and 13B. In each of the left and right circuit sections, selector valve 13A or 13B is on the suction side of pump 15, and selector valve 10A or 10B is on the discharge side.

In each of the left and right circuit sections, there are provided, on the suction side of pump 15, an inlet valve 16 for preventing reverse flow of inlet fluid flow, and on the discharge side of pump 15, an outlet valve 17 for preventing reverse flow of outlet fluid flow, and a damper chamber 18 for restraining pulsation of the discharge pressure. Front left and rear right wheel cylinders 9FL and 9RR are connected, respectively, through normally-closed type outlet solenoid valves 19FL and 19RR, to the downstream (pump's side) of selector valve 13A. Front right and rear left wheel cylinders 9FR and 9RL are connected, respectively, through normally-closed type outlet solenoid valves 19FR and 19RL, to the downstream (pump's side) of selector valve 13B.

A reservoir 20 for storing the brake fluid pressure temporarily to assist a wheel cylinder pressure decrease operation, on each of the upstream side (toward selector valve 13A) of output solenoid valves 19FL and 19RR, and the upstream side (toward selector valve 13B) of output solenoid valves 19FR and 19RL.

In the thus-constructed hydraulic circuit 6, brake pressure produced by a driver's brake pedal operation is supplied in an ordinary manner to each wheel cylinder 9$i$, through selector valve 10A and 10B and inlet solenoid valves 11$i$ when the selector valves 10A and 10B, selector valves 13A and 13B, inlet solenoid valves 11$i$ and outlet solenoid valves 19$i$ are in a deenergized state.

This hydraulic circuit 6 can increase the brake is fluid pressure of each wheel cylinder 9$i$, without regard to driver's brake operation, by supplying the brake pressure sucked from master cylinder 8 through selector valves 13A or 13B, to that wheel cylinder 9$i$ through the corresponding inlet solenoid valve 11$i$ when selector valve 10A or 10B and selector valve 13A or 13B are energized, and pump 15 is driven. The hydraulic circuit 6 can hold the brake pressure to each wheel cylinder 9$i$ by shutting off the wheel cylinder 9$i$ together with pump 15 and reservoir 20 when selector valve 10A or 10B and inlet solenoid valve 11$i$ are energized. The hydraulic circuit 6 can decrease the brake pressure to each wheel cylinder 9$i$ by sucking the brake pressure from the wheel cylinder 9$i$ by pump 15 to the reservoir 20 when selector valve 10A or 10B and inlet and outlet solenoid valves 11$i$ and 19$i$ are energized and pump 15 is driven. By controlling selector valves 10A, 10B, 13A and 13B, inlet and outlet solenoid valves 11$i$ and 19$i$ and pump 15 in this way, controller 5 can increase, hold and decrease the brake fluid pressure of each wheel cylinder 9$i$.

FIG. 3 shows the turning motion control process performed by controller 5 at regular time intervals of a predetermined time (10 msec, in this example) as timer interrupt routine.

At step S1, controller 5 reads input information of the signals from the sensors. In this example, the input information includes the wheel speeds Vwi from the wheel speed sensor 1; the longitudinal acceleration Xg and lateral acceleration Yg from acceleration sensor 2; the steering wheel angle θ from steering angle sensor 3; and the yaw rate from yaw rate sensor 4. Then, at next step S2, controller 5 calculates a vehicle body speed V (referred to as a vehicle turning speed hereinafter). It is possible to calculate the vehicle turning speed V from the wheel speeds Vi and longitudinal acceleration Xg by a known process. At step S3 following S2, controller 5 calculates a current vehicle turning radius R from turning speed V and lateral acceleration Yg according to the following equation (1), $$R = V^2 / Yg \qquad (1)$$

In this example, vehicle turning radius R is calculated from turning speed V and lateral acceleration Yg. However, the method of calculating turning radius R is not limited to this. It is optional to calculate the vehicle turning radius R by using the steering angle θ or yaw angular acceleration to improve the accuracy.

At step S4, controller 5 calculates a base deceleration start turning radius threshold (or base auto brake start radius threshold) Rs used as a threshold of the turning radius R to start the automatic deceleration control. In this example, controller 5 first determines a limit turning radius RL defining a range enabling stable turning motion with the current turning speed V, by using the following equation (2).

$$RL = V^2 / YgL \qquad (2)$$

In this equation, YgL is a limit lateral acceleration enabling stable turning motion which is determined by vehicle specification data items. It is optional to vary the limit lateral acceleration YgL in accordance with a slip rate Si of each wheel determined from the wheel speed Vwi and is turning speed V.

Then, base radius threshold Rs is determined by multiplying the limit turning radius RL by a predetermined coefficient h which is greater than one. Preferably, h is slightly greater than one, and set approximately equal to 1.1. In this example, h=1.1.

$$Rs = h \cdot RL \qquad (3)$$

In this example, coefficient h is set slightly greater than one (h=1.1) to set the base radius threshold Rs slightly greater than the limit turning radius RL and thereby to provide a margin in order to initiate the automatic deceleration control operation before the actual turning radius R reaches the limit turning radius RL, and before the tire grip is saturated.

At step S5, controller 5 calculates a base deceleration start turning speed threshold (or auto brake start speed threshold) Vs used as a threshold of the turning speed V to start the automatic deceleration control in accordance with the current turning speed V. In this example, controller 5 first determines a limit turning speed VL which enables stable turning motion with the current turning radius R, by using the following equation (4). That is, limit turning speed VL is equal to the square root of (R·YgL).

$$VL = (R \cdot YgL)^{1/2} \qquad (4)$$

Then, base speed threshold Vs is determined by multiplying the limit turning speed VL by a predetermined coefficient k which is smaller than one. Preferably, k is slightly smaller than one and set approximately equal to 0.9. In this example, k=0.9.

$$Vs = k \cdot VL \qquad (5)$$

In this example, coefficient k is set slightly smaller than one (k=0.9) to set the speed threshold Vs slightly smaller than VL and to provide a margin in order to initiate the automatic deceleration control operation before the turning speed V reaches the limit turning speed VL, and before the tire grip is saturated.

At step S6, controller 5 calculates a vehicle running state variation or a variation of a vehicle running state. In this embodiment, the vehicle running state variation (quantity) is yaw rate variation $\Delta\phi$ of yaw rate $\phi$ sensed by yaw rate sensor 4. In this example, the yaw rate variation $\Delta\phi$ is determined according to the following equation (6).

$$\Delta\phi = [\phi(t) - \phi(t-\Delta t)]/\Delta t \qquad (6)$$

In this equation, $\Delta t$ is a predetermined time length. When the result of calculation to determine the yaw rate variation $\Delta\phi$ by equation (6) is negative, then $\Delta\phi$ is set equal to the absolute value of the result. The yaw rate variation or the variation (quantity) of the yaw rate $\phi$ is a variable representing a time rate of change of a vehicle turning so motion variable.

At step S7, controller 5 determines a correction coefficient Krs for correcting the base deceleration start radius threshold Rs. In this example, correction coefficient Krs is determined, by using a control map shown in S7 of FIG. 3, in accordance with the yaw rate variation 6, $\phi$ calculated at S6. In this control map of S7, the horizontal axis represents yaw rate variation $\Delta\phi$ and the vertical axis represents correction coefficient Krs. Correction coefficient Krs is constantly equal to a first (smaller) coefficient value (1.0, in this example) in a small yaw rate variation region in which the yaw rate variation $\Delta\phi$ is smaller than or equal to a first yaw rate variation value $\Delta\phi1$ (12 deg/s/s, in this example). Correction coefficient Krs is increased linearly, or in proportion to the yaw rate variation, from the small coefficient value (1.0) as the yaw rate variation increases from the first yaw rate variation value $\Delta\phi1$. In a greater yaw rate variation region in which the yaw rate variation $\Delta\phi$ is greater than or equal to a second (greater) yaw rate variation value $\Delta\phi2$ (16 deg/s/s, in this example), correction coefficient Krs is constantly equal to a second (greater) coefficient value (1.3, in this example) greater than the first coefficient value (1.0).

After S7, controller 5 proceeds to step S8 and determines a correction coefficient Kvs for correcting the base deceleration start speed threshold Vs. In this example, correction coefficient Kvs is determined, by using a control map shown in S8 of FIG. 3, in accordance with the yaw rate variation $\Delta\phi$ calculated at S6. In this control map of S8, the horizontal axis represents yaw rate variation $\Delta\phi$ and the vertical axis represents correction coefficient Kvs. Correction coefficient Kvs is constantly equal to a first (greater) coefficient value (1.0, in this example) in a small yaw rate variation region in which the yaw rate variation $\Delta\phi$ is smaller than or equal to a third yaw rate variation value $\Delta\phi11$ (12 deg/s/s, in this example). Correction coefficient Kvs is decreased linearly or in inverse proportion from the greater coefficient value (1.0) as the yaw rate variation increases from the third yaw rate variation value $\Delta\phi11$. In a greater yaw rate variation region in which the yaw rate variation $\Delta\phi$ is greater than or equal to a fourth yaw rate variation value $\Delta\phi12$ (16 deg/s/s, in this example), correction coefficient Kvs is constantly equal to a smaller coefficient value (0.7, in this example) smaller than the greater coefficient value (1.0).

The yaw rate variation values $\Delta\phi1$ and $\Delta\phi11$ used in the control maps shown in S7 and S8 are predetermined values determined by experiments. Yaw rate variation values $\Delta\phi1$ and $\Delta\phi11$ are set at such values as to prevent the deceleration effect by the automatic deceleration from being reduced by a response delay in the initial brake pressure at the time of start of the automatic deceleration. The yaw rate variation values $\Delta\phi2$ and $\Delta\phi12$ and correction coefficients Krs and Kvs are determined experimentally at such values to make it possible to secure a brake pressure to prevent an initial brake pressure delay by the time of start of the automatic deceleration.

At next step S9, controller 5 calculates a so modified deceleration start (or auto brake start) radius threshold Rs* by multiplying the base deceleration start radius threshold Rs determined at S4, by the correction coefficient Krs determined at S7 (Rs*=Rs×Krs); and further calculates a modified deceleration start (auto brake start) speed threshold Vs* by multiplying the base deceleration start speed threshold Vs determined at S5, by the correction coefficient Kvs determined at S8 (Vs*=Vs×Kvs).

At next step S10, controller 5 examines whether the current turning radius R is smaller than the modified deceleration start radius threshold Rs* determined at S9, or the current turning speed V is higher than the modified deceleration start speed threshold Vs* determined at S9. When at least one of the first condition (R<Rs*) and the second condition (V>Vs*) is met, the controller 5 proceeds to step S11 on the assumption that the vehicle turning state approaches the turning ability limit and the automatic deceleration is appropriate. If, on the other hand, the current turning radius R is greater than or equal to Rs* (R≧Rs*) and at the same time the current turning speed V is lower than or equal to Vs* (V≦Vs*), then controller 5 terminates the process of FIG. 3 directly after S10 and returns to a main program on the assumption that the vehicle turning state is not near the turning ability limit and the automatic braking is not necessary.

At step S11 following S10, controller 5 calculates a target vehicle deceleration Xg* to ensure stable vehicle turning motion, in accordance with a deviation of turning radius R from the modified threshold Rs* (R−Rs*), and a deviation of turning speed V from the modified threshold Vs* (Vs*−V) so that the target deceleration Xg* becomes higher as these deviations become greater. It is possible to use a know method for calculating target deceleration Xg*.

At step S12, controller calculates an engine output decrease control quantity to achieve the target deceleration Xg* by the engine output control. Then, at step S13, controller 5 calculates a brake control quantity to compensate for a deficiency when the engine output decrease control with the engine output decrease control quantity alone is deficient for achieving the target deceleration Xg*. In this example, the control system is arranged to achieve the calculated target deceleration Xg* only by the engine output decrease control if it is possible to achieve the target deceleration Xg* only by the engine output decrease control. If the engine output decrease control is deficient to attain the target deceleration Xg* alone, and there remains an amount of deceleration to be attained, the control system adds the brake control to the engine output decrease control so that the remaining amount of deceleration is achieved by the brake control.

At a step S14 next to S13, controller 5 calculates a target brake fluid pressure Pi to achieve the target brake control quantity determined at S13. Then, at step S15, controller delivers the brake control signal to achieve the target brake fluid pressure determined at S14 to the brake actuator or actuating system 6, and deliver the engine output control signal to achieve the target engine output decrease control quantity to the engine output control actuator 7. After S15, controller 5 terminate the process of FIG. 3, and returns to the main program. When, on the other hand, the answer of S10 is NO, controller 5 terminates the process of FIG. 3 without entering the section of S11-S15, and returns to the main program on the assumption that the vehicle turning state is not near the turning ability limit and the automatic braking is not required.

Figure 4A:
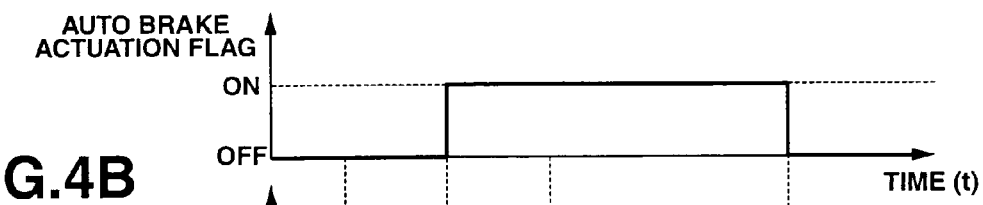
FIGS. 4A, 4B, 4C and 4D are timing chart illustrating operations of the turning motion control system of FIG. 1.
Figure 4B:
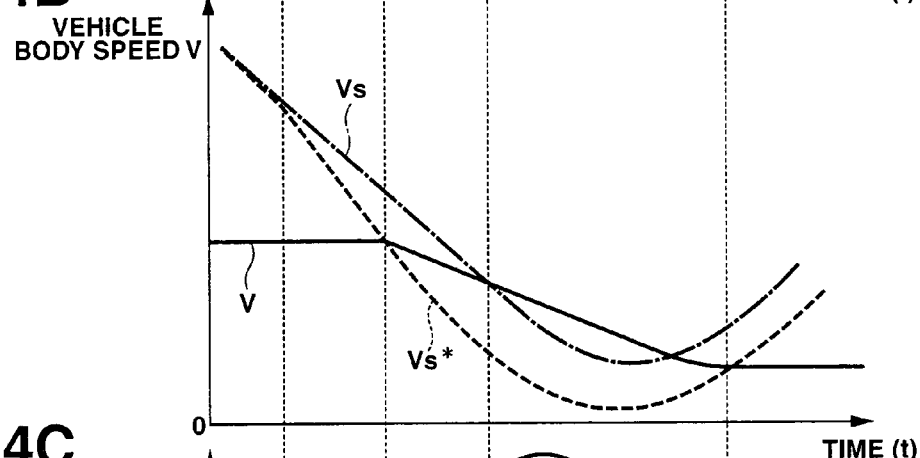
Figure 4C:
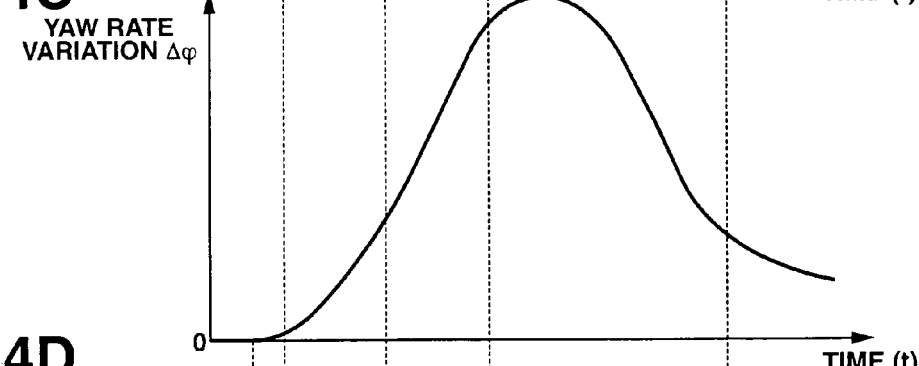
Figure 4D:
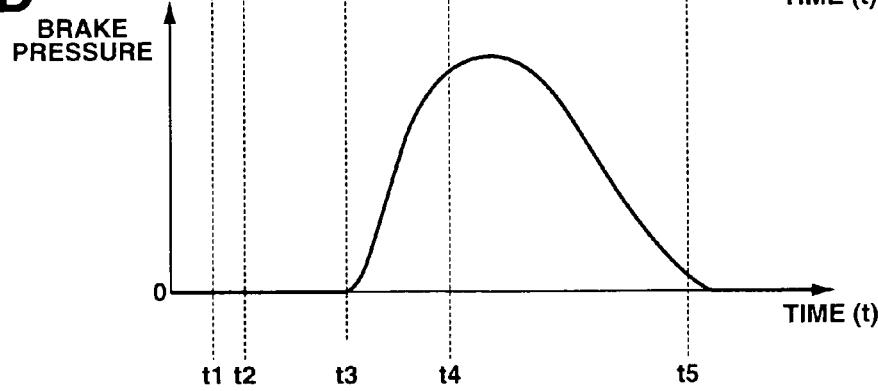

The thus-constructed control system according to the first embodiment is operated as follows: FIG. 4A shows an auto brake actuation flag or condition code indicating the state of the automatic deceleration control. This flag is ON when the automatic deceleration control is in operation, and OFF when the automatic deceleration control is inoperative. FIGS. 4B, 4C and 4D show behavior of the vehicle body speed V, yaw rate variation $\Delta\phi$, and wheel cylinder brake fluid pressure controlled by the control system.

The control system calculates the base deceleration start thresholds Rs and Vs in accordance with the input information collected by the sensors (S1~S5); calculates the yaw rate variation $\Delta\phi$ (S6); sets the correction coefficients Krs and Kvs in accordance with the yaw rate variation $\Delta\phi$ of the vehicle body (S7, S8); and determines the modified (final) deceleration start thresholds Rs* and Vs* by using the base thresholds Rs and Vs and the correction coefficients Krs and Kvs (S9). Then, the control system determines whether to initiate the automatic deceleration control or not, by comparing the current actual turning radius R and the current actual vehicle speed V, respectively, with the modified radius threshold Rs* and the modified speed threshold Vs* (S10); and controls the deceleration of the vehicle by controlling the engine output control actuator 7 and the brake control actuator 6 so as to achieve a target deceleration Xg* calculated from the current turning radius R and vehicle speed V and the thresholds Rs* and Vs* (S11~S15) when R<Rs* or V>Vs*.

In general, the yaw rate variation $\Delta\phi$ remains approximately equal to zero when the vehicle is running straight at a constant speed. Therefore, correction coefficients Krs and Kvs are set to one at S7 and S8, and the final, modified thresholds Rs* and Vs* are equal, respectively, to the base thresholds Rs and Vs. In this straight ahead operation of the vehicle, the deceleration start speed threshold Vs* shown by a broken line in FIG. 4B is sufficiently higher than the vehicle body speed V shown by a solid line in FIG. 4B, and hence V≦Vs*.

Besides, the turning radius R is greater than Rs* by far. Consequently, the answer of S10 is NO, and the control system terminates the process of FIG. 3 without entering the automatic deceleration control section S11~S15.

Therefore, the control system does not perform the automatic deceleration by the turning motion control when the vehicle is in a stable straight running state. In this normal state, the control system allows the brake fluid pressure corresponding to the driver's brake pedal operation to be supplied through brake actuator 6, to each wheel cylinder 9i, and refrains from control intervention of the automatic deceleration control. The explanation is mainly directed to the vehicle body speed V hereinafter since the control system is operated in the same manner when the attention is directed to the turning radius.

If the driver turns steering wheel 3a, and the vehicle yaw rate $\phi$ starts varying, the yaw rate variation $\Delta\phi$ start increasing at an instant t1 as shown in FIG. 4C. However, the yaw rate variation $\Delta\phi$ is still in the small yaw rate variation region smaller than or equal to the predetermined values $\Delta\phi1$ and $\Delta\phi11$, the correction coefficients Krs and Kvs are set equal to 1.0, and the base thresholds Rs and Vs are used directly as the final modified threshold Rs* and Vs* without threshold modification.

When yaw rate variation $\Delta\phi$ is further increase by the steering operation, the control system increases the correction coefficient Krs and decreases the correction coefficient Kvs in accordance with the yaw rate variation $\Delta\phi$. Therefore, the modified speed threshold Vs* is decreased gradually below the base speed threshold Vs as shown in FIG. 4B, and the decrease quantity increases with an increase of yaw rate variation $\Delta\phi$. When the modified speed threshold Vs* becomes lower than the current turning speed V at an instant t3, the control system proceeds from S10 to S11, and initiates the automatic deceleration control of S11-S15.

Thus, the control system decelerates the vehicle to achieve the target deceleration Xg and hence decrease the vehicle speed V by increasing the brake fluid pressure from t3 as shown in FIG. 4D, and restraining the engine output. When base threshold Vs decreases with a decrease of the turning radius R, and base threshold Vs becomes lower than vehicle speed V at an instant t4, the control system continues the automatic deceleration control. When the steering operation settles down and the vehicle speed V is decreased, the vehicle turning speed V becomes lower than the threshold Vs*, and the turning radius R becomes greater than the deceleration start threshold Rs, then the control system considers that the vehicle is controlled into a stable turning region and therefore, terminates the automatic deceleration control.

In this embodiment, the brake actuation system 6 employs the hydraulic circuit using pump 15 for increasing the brake fluid pressure as shown in FIG. 2. Therefore, as shown in FIG. 5B, an actual brake fluid pressure starts rising at t14 with a delay of a dead time after t13 at which the turning speed V becomes higher than threshold Vs, and hence the control system starts increasing the command brake fluid pressure of a control signal to each wheel cylinder 9i, by driving pump 15. This dead time between t13 and t14 causes an initial response delay, and makes it difficult to increase the vehicle deceleration quickly.

Figure 5A:
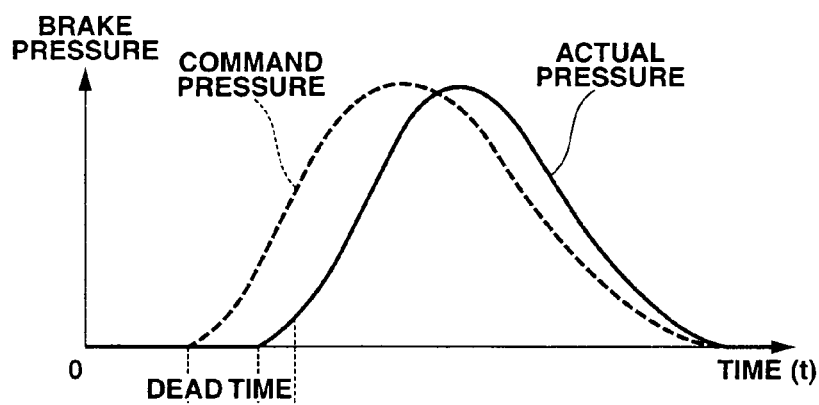
FIGS. 5A and 5B are timing chart illustrating effects of the turning motion control system of FIG. 1.
Figure 5B:
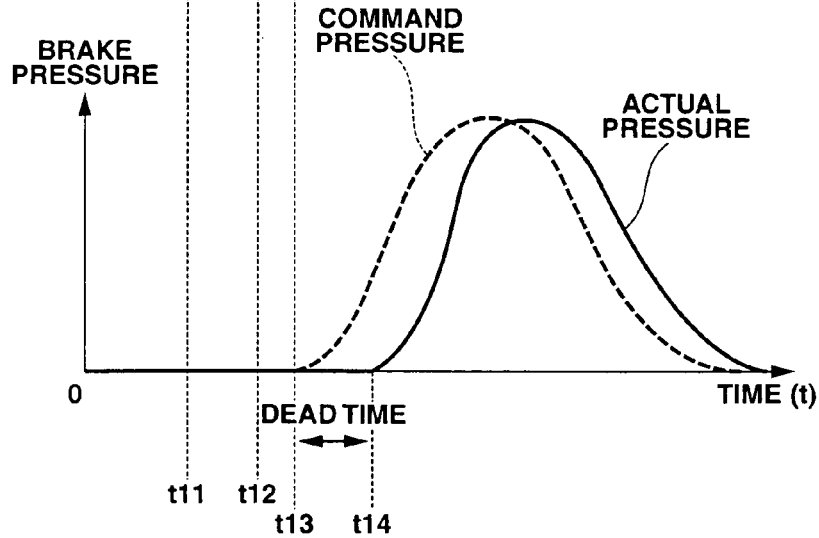

However, as shown by a broken line in FIG. 5A, the control system according to the first embodiment is arranged to start the automatic deceleration control, before t13, at an instant t11 at which the modified threshold Vs* (which is set slightly lower than base threshold Vs) becomes lower than the turning speed V. Consequently, the control system can start increasing the wheel cylinder brake fluid pressure at t12, and provide a slightly increase brake pressure level at t13 at which base threshold Vs becomes lower than turning speed V and the automatic deceleration is required. In this way, the control system according to the first embodiment can restrain the response delay of the brake fluid pressure in the initial state of the automatic deceleration control, improve the control response, and decelerate the vehicle timely.

When, for example, the vehicle enters a corner with an overspeed, and the driver turns steering wheel 3a quickly to prevent deviation from a lane on the corner, the control system can start the automatic deceleration control quickly and decelerate the vehicle timely, by adjusting the threshold Vs* in a direction to advance the timing to initiate the automatic deceleration control with an increase in the yaw rate variation $\Delta\phi$. Despite the involvement of a dead time between t11 and t12 by the hydraulic circuit, the control system can start increasing the wheel cylinder brake pressure at a proper timing near t13 when the automatic deceleration is actually required.

When, on the other hand, the driver increases the steering wheel angle gradually along a cornering course, and the yaw rate variation Δφ remains within a smaller region where a quick deceleration is not required, the control system does not modify the threshold Vs* so much by holding the correction coefficient Kvs equal to 1.0 or a value approximately equal to 1.0, and does not advance the timing of starting the deceleration control uselessly to prevent unnatural feeling from being aroused in the driver, and to improve the durability of the brake control actuator 6 and other components.

In the smaller yaw rate variation region smaller than Δφ1 and Δφ11, the correction coefficients Krs and Kvs are set to one or a value close to one. Each of the yaw rate variation values Δφ1 and Δφ11 is so determined as to prevent a useless advance of the deceleration control start timing in the region in which the initial response delay of the brake fluid pressure is not problematical without modification of the threshold Vs. In the greater yaw rate variation region greater than Δφ2 and Δφ12, the correction coefficients Krs and Kvs are held constant with no further adjustment so as to prevent the timing of starting the automatic deceleration control from being advanced excessively, and to prevent a needless actuation of the deceleration control.

The first embodiment employs the yaw rate variation Δφ as the vehicle running state variation. The use of yaw rate variation is appropriate to adjust the deceleration control start timing properly. In the case of the lateral acceleration, the sensed lateral acceleration tends to be smaller on a low friction coefficient road than a level sensed on a high friction coefficient road, so that the deceleration control start timing might not be adjusted properly. By employing the yaw rate variation, the control system according to the first embodiment can adjust the automatic deceleration control start timing adequately without regard to road surface conditions.

Figure 6:
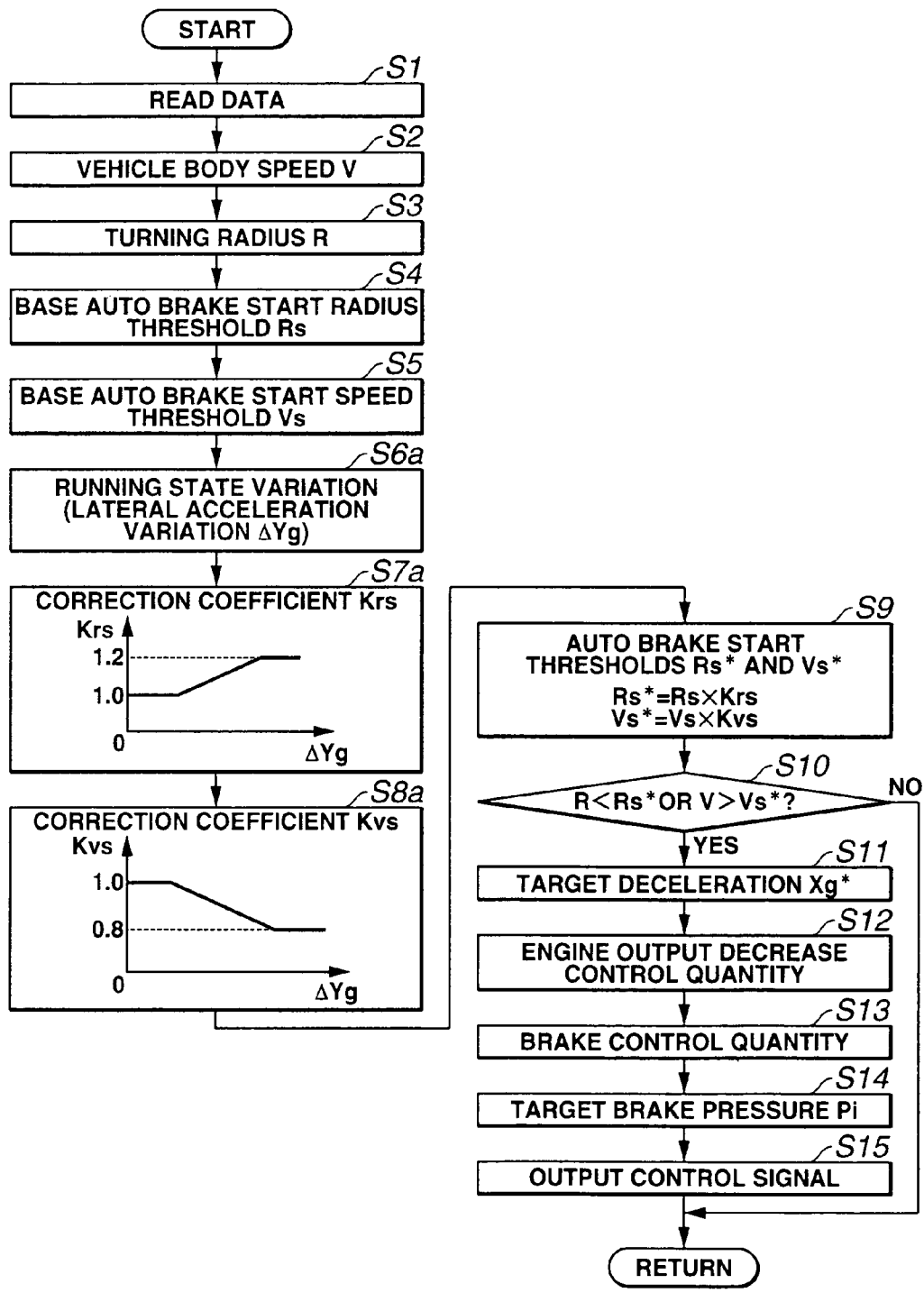
FIG. 6 is a flowchart showing a vehicle turning motion control process performed by a vehicle turning motion control system according to a second embodiment of the present invention.

FIG. 6 shows a turning motion control process performed by a turning motion control system according to a second embodiment of the present invention. The second embodiment employs the lateral acceleration variation ΔYg as the running state variation, instead of yaw rate variation Δφ. The control system according to the second embodiment is basically identical to the control system according to the first embodiment, so that repetitive explanation is omitted.

In the control process of FIG. 6, controller 5 of the control system according to the second embodiment reads the input information of the signals from the sensors at S1; calculates the current vehicle body speed V and current vehicle turning radius R at S2 and S3; and calculates the base deceleration control start thresholds (or auto brake start thresholds) Rs and Vs at S4 and S5 as in the control process of FIG. 3.

At a step S6a following S5, controller 5 calculates the vehicle running state variation. In the second embodiment, the vehicle running state variation (quantity) is a lateral acceleration variation ΔYg of the lateral acceleration or side acceleration Yg of the vehicle sensed by the acceleration sensor 2. In this example, the lateral acceleration variation ΔYg is a variation quantity of the lateral acceleration Yg during Δt as in the first embodiment. When the result of calculation to determine the lateral acceleration variation ΔYg is negative, then ΔYg is set equal to the absolute value of the result.

At step S7a, controller 5 determines a correction coefficient Krs for correcting the base deceleration start radius threshold Rs. In this example, correction coefficient Krs is determined, by using a control map shown in S7a of FIG. 6, in accordance with the lateral acceleration variation ΔYg calculated at S6a. In this control map of S7a, the horizontal axis represents lateral acceleration variation ΔYg and the vertical axis represents correction coefficient Krs. Correction coefficient Krs is constantly equal to a first (smaller) coefficient value (1.0, in this example) in a small lateral acceleration variation region in which the lateral acceleration variation ΔYg is smaller than or equal to a first lateral acceleration variation value (ΔYg1=3 m/s²/s, for example). Correction coefficient Krs is increased linearly (or in proportion to ΔYg) from the small coefficient value (1.0) as the lateral acceleration variation increases from the first lateral acceleration variation value (ΔYg1). In a greater lateral acceleration variation region in which the lateral acceleration variation ΔYg is greater than or equal to a second (greater) lateral acceleration variation value (ΔYg2=6 m/s²/s, for example), correction coefficient Krs is constantly equal to a second (greater) coefficient value (1.2, in this example) greater than the first coefficient value (1.0).

After S7a, controller 5 proceeds to step S8a and calculates a correction coefficient Kvs for correcting the base deceleration start speed threshold Vs. In this example, correction coefficient Kvs is determined, by using a control map shown in S8a of FIG. 6, in accordance with the lateral acceleration variation ΔYg calculated at S6a. In this control map of S8a, the horizontal axis represents lateral acceleration variation ΔYg and the vertical axis represents correction coefficient Kvs. Correction coefficient Kvs is constantly equal to a first (greater) coefficient value (1.0, in this example) in a small lateral acceleration variation region in which the lateral acceleration variation ΔYg is smaller than or equal to a third lateral acceleration variation value (3 m/s²/s, for example). Correction coefficient Kvs is decreased linearly or in an inverse proportion to ΔYg, from the greater coefficient value (1.0) as the lateral acceleration variation increases from the third lateral acceleration variation value. In a greater lateral acceleration variation region in which lateral acceleration variation ΔYg is greater than or equal to a fourth lateral acceleration variation value (6 m/s²/s, for example), correction coefficient Kvs is constantly equal to a smaller coefficient value (0.8, in this example) smaller than the greater coefficient value (1.0).

After the setting of correction coefficients Krs and Kvs based on lateral acceleration variation ΔYg, controller 5 proceeds to step S9, and calculates the modified deceleration start radius threshold Rs* by multiplying the base deceleration start radius threshold Rs determined at S4, by the correction coefficient Krs determined at S7a (Rs*=Rs×Krs); and further calculates the modified deceleration start speed threshold Vs* by multiplying the base deceleration start speed threshold Vs determined at S5, by the correction coefficient Kvs determined at S8a (Vs*=Vs×Kvs) as in the control process of FIG. 3. Then, controller 5 performs the automatic deceleration control of S11-S15 in dependence on the answer of the decision step S10 in the same manner as in the control process of FIG. 3.

Thus, the control system according to the second embodiment, too, can provide the same advantageous effects as in the first embodiment. The yaw rate variation employed in the first embodiment is liable to require more time until the yaw rate variation is actually detected by the sensing system, so that the adjustment of base threshold Rs and Vs tends to be delayed. In the second embodiment, the control system can detect a variation of a vehicle turning state by using the lateral acceleration Yg, and thereby adjust the thresholds Rs and Vs timely.

As the vehicle running state variation, the first embodiment employs the yaw rate variation and the second embodiment employs the lateral acceleration variation. However, it is optional to modify the base deceleration start thresholds Rs and Vs in accordance with the yaw rate variation and the lateral acceleration variation both. As mentioned before, the yaw rate tends to require time to be detected as the yaw rate variation, and the lateral acceleration tends to be low when sensed on a low friction road surface. Therefore, it is possible to modify the base thresholds Rs and Vs accurately by using both the yaw rate variation and lateral acceleration variation in combination. In this case, for example, the control system may be arranged to determine the deceleration start thresholds Rs and Vs based on the yaw rate variation and the deceleration start thresholds Rs and Vs based on the lateral acceleration variation; and to select one from the two thresholds Rs so as to start the deceleration control earlier, and one from the two thresholds Vs so as to start the deceleration control earlier.

The vehicle running state variation is not limited to the yaw rate variation of the first embodiment and the lateral acceleration variation of the second embodiment. It is optional to employ, as the vehicle running state variation, a steering angle variation $\Delta\theta$. By using the variation of the steering angle or the steering wheel angle, the control system can detect a variation of the vehicle running state earlier, as compared to the detection of variation in the yaw rate or lateral acceleration.

Moreover, it is optional to sense, as the vehicle running state, a left and right wheel speed difference (a difference between the wheel speed of a left wheel and the wheel speed of a right wheel of a vehicle), or the steering angle, and to determine the correction coefficients Krs and Kvs in accordance with the sensed left and right wheel speed difference or the sensed steering angle on the assumption that the vehicle is turning more sharply when the sensed left and right wheel speed difference or the sensed steering angle is greater.

Moreover, it is optional to employ the vehicle body speed V as the vehicle running state, and to determine the correction coefficient Krs and Kvs in accordance with the sensed vehicle body speed V. In this case, since the vehicle demands a better initial response speed of the brake fluid pressure when the vehicle speed is higher, the control system may be arranged to modify the base thresholds Rs and Vs so as to advance the deceleration control start timing as the vehicle body speed becomes higher. The thus-constructed control system can start the automatic deceleration control timely even when the vehicle speed is high.

Moreover, it is optional to modify the base thresholds Rs and Vs by using any two or more of these variables in combination as parameter or parameters representing the vehicle running state, so as to start the automatic deceleration control at an accurate timing to improve the effect of the deceleration control.

Figure 7:
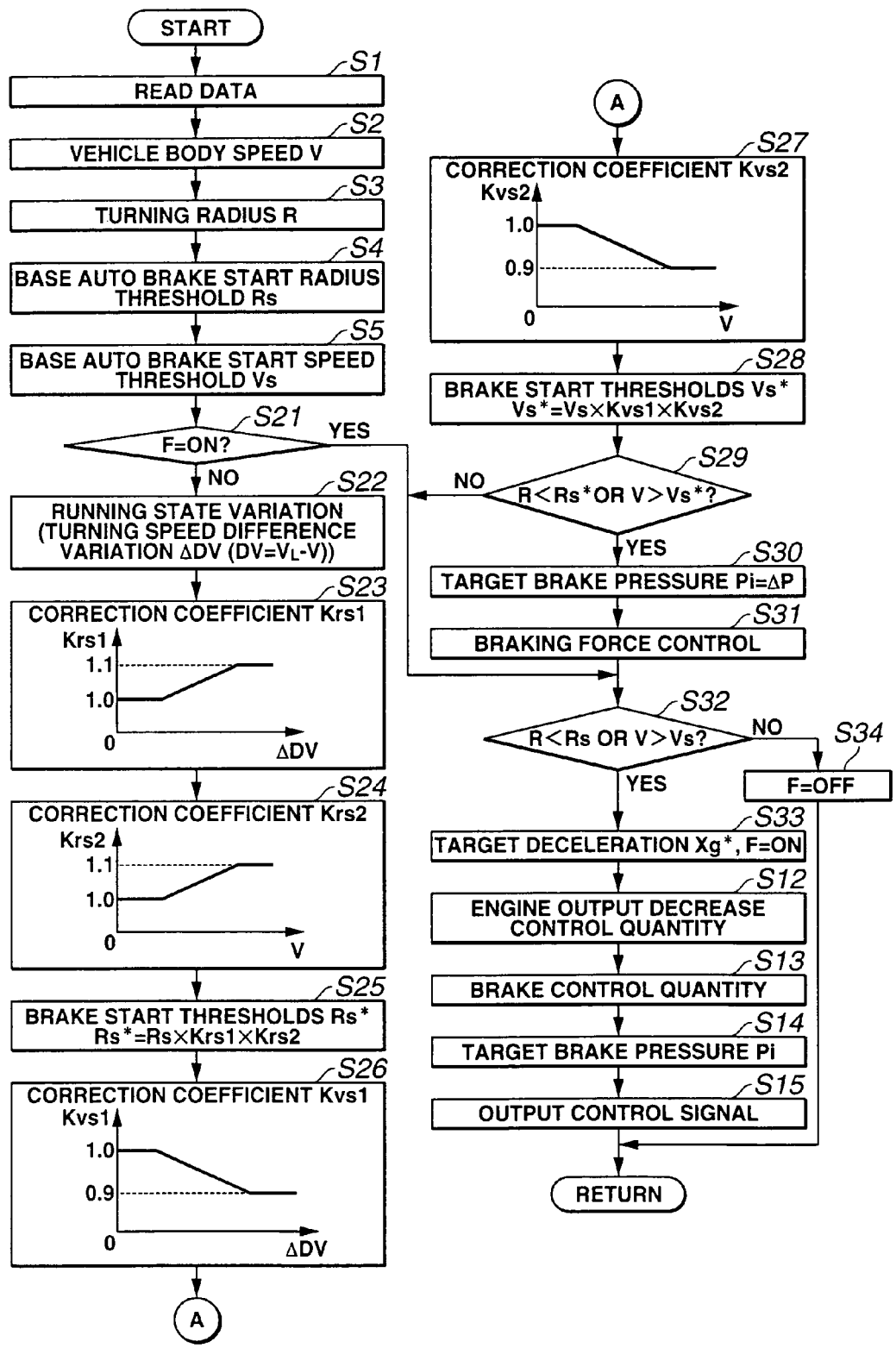
FIG. 7 is a flowchart showing a vehicle turning motion control process performed by a vehicle turning control system according to a third embodiment of the present invention.

FIG. 7 shows a turning motion control process performed by a turning motion control system according to a third embodiment of the present invention. The control system according to the third embodiment is basically identical to the control system according to the first embodiment, so that repetitive explanation is omitted, and the following explanation is mainly directed only to the different points.

In the control process of FIG. 7, controller 5 of the control system according to the third embodiment reads the input information of the signals from the sensors at S1; calculates the current vehicle body speed V and current vehicle turning radius R at S2 and S3; and calculates the base deceleration control start thresholds (or auto brake start thresholds) Rs and Vs at S4 and S5 as in the control process of FIG. 3.

Then, at a step S21 following S5, control 5 examines whether an automatic deceleration flag F is set at ON or not. This automatic deceleration flag F is a condition code indicating the operative or inoperative state of the automatic deceleration control to produce the vehicle deceleration corresponding to the target deceleration Xg*. When F is not ON, controller 5 proceeds from S21 to a next step S22 for determining the vehicle running state.

At S22, controller 5 according to the third embodiment calculates a turning speed difference variation $\Delta DV$ which is a variation of a vehicle speed turning speed difference $DV$ (=VL−V) resulting from subtraction of the current vehicle body speed V from the limit turning speed VL calculated by the equation (4) in the process of the calculation of the base speed threshold Vs at S5. When the result of calculation to determine the turning speed difference variation $\Delta DV$ is negative, then $\Delta DV$ is set equal to the absolute value of the result.

At step S23 following S22, controller 5 determines a first correction coefficient Krs1 for correcting the base deceleration start radius threshold Rs. In this example, first correction coefficient Krs1 is determined, by using a control map shown in S23 of FIG. 7, in accordance with the turning speed difference variation $\Delta DV$ calculated at S22. In this control map of S23, the horizontal axis represents turning speed difference variation $\Delta DV$ and the vertical axis represents first correction coefficient Krs1. First correction coefficient Krs1 is constantly equal to a first (smaller) coefficient value (1.0, in this example) in a small turning speed difference variation region in which the turning speed difference variation $\Delta DV$ is smaller than or equal to a first turning speed difference variation value $\Delta DN1$ (150 km/h/s, for example). First correction coefficient Krs1 is increased linearly (or in proportion to $\Delta DV$) from the small coefficient value (1.0) as the turning speed difference variation $\Delta DV$ increases from the first turning speed difference variation value $\Delta DN1$. In a greater turning speed difference variation region in which the turning speed difference variation $\Delta DN$ is greater than or equal to a second (greater) turning speed difference variation value $\Delta DV2$ (250 km/h/s, for example), correction coefficient Krs1 is constantly equal to a second (greater) coefficient value (1.1, in this example) greater than the first coefficient value (1.0).

At step S24 following S23, controller 5 determines a second correction coefficient Krs2 for correcting the base deceleration start radius threshold Rs in accordance with the vehicle body speed V. In this example, second correction coefficient Krs2 is determined, by using a control map shown in S24 of FIG. 7, in accordance with vehicle body speed calculated at S2. In this control map of S24, the horizontal axis represents vehicle body speed V and the vertical axis represents second correction coefficient Krs2. Second correction coefficient Krs2 is constantly equal to a first (smaller) coefficient value (1.0, in this example) in a lower vehicle body speed region in which the vehicle body speed V is lower than or equal to a first speed value (50 km/h, for example). Second correction coefficient Krs2 is increased linearly (or in proportion to V) from the small coefficient value (1.0) as vehicle body speed V increases from the first vehicle body speed value. In a higher vehicle body speed in which the vehicle body speed is higher than or equal to a second (greater) speed value (80 km/h, for example), second correction coefficient Krs2 is constantly equal to a second (greater) coefficient value (1.1, in this example) greater than the first coefficient value (1.0).

After the setting of correction coefficients Krs1 and Krs2, controller 5 proceeds to step S25, and calculates the modified deceleration start radius threshold Rs* by multiplying the base deceleration start radius threshold Rs determined at S4, by the first correction coefficient Krs1 determined at S23 and the second correction coefficient Krs2 determined at S24 (Rs*=Rs×Krs1×Krs2). As shown in the control map of S23, first correction coefficient Krs1 is increased when a higher response speed is demanded to start the automatic deceleration control since the vehicle speed V approaches the limit speed VL rapidly and hence the turning speed difference variation ΔDV is increased. On the other hand, second correction coefficient Krs2 is increased when the vehicle speed becomes higher and a quick control response is demanded. Therefore, the control system can modify the base threshold Rs to a greater threshold value adequately when a quick control response is desired, and thereby determine the modified threshold so as to increase the tendency to start the automatic deceleration control earlier.

At step S26 following S25, controller 5 determines a first correction coefficient Kvs1 for correcting the base deceleration start speed threshold Vs. In this example, first correction coefficient Kvs1 is determined, by using a control map shown in S26 of FIG. 7, in accordance with the turning speed difference variation ΔDV calculated at S22. In this control map of S26, the horizontal axis represents turning speed difference variation ΔDV and the vertical axis represents first correction coefficient Kvs1. First correction coefficient Kvs1 is constantly equal to a first (greater) coefficient value (1.0, in this example) in a small turning speed difference variation region in which the turning speed difference variation ΔDV is smaller than or equal to a third (smaller) turning speed difference variation value ΔDN3 (150 km/h/s, for example). First correction coefficient Kvs1 is decreased linearly (or in inverse proportion to ΔDV) from the small coefficient value (1.0) as the turning speed difference variation ΔDV increases from the third turning speed difference variation value ΔDN3. In a greater turning speed difference variation region in which the turning speed difference variation ΔDN is greater than or equal to a fourth (greater) turning speed difference variation value ΔDV4 (250 km/h/s, for example), first correction coefficient Kvs1 is constantly equal to a second (smaller) coefficient value (0.9, in this example) smaller than the first coefficient value (1.0).

At step S27 following S26, controller 5 determines a second correction coefficient Kvs2 for correcting the base deceleration start speed threshold Vs in accordance with the vehicle body speed V. In this example, second correction coefficient Kvs2 is determined, by using a control map shown in S27 of FIG. 7, in accordance with vehicle body speed calculated at S2. In this control map of S27, the horizontal axis represents vehicle body speed V and the vertical axis represents second correction coefficient Kvs2. Second correction coefficient Kvs2 is constantly equal to a first (greater) coefficient value (1.0, in this example) in a lower vehicle body speed region in which the vehicle body speed V is lower than or equal to a third speed value (50 km/h, for example). Second correction coefficient Kvs2 is decreased linearly (or in inverse proportion to V) from the greater coefficient value (1.0) as vehicle body speed V increases from the first vehicle body speed value. In a higher vehicle body speed region in which the vehicle body speed is higher than or equal to a fourth (higher) speed value (80 km/h, for example), second correction coefficient Kvs2 is constantly equal to a second (smaller) coefficient value (0.9, in this example) smaller than the first coefficient value (1.0).

After the setting of correction coefficients Kvs1 and Kvs2, controller 5 proceeds to step S28, and calculates the modified deceleration start speed threshold Vs* by multiplying the base deceleration start speed threshold Vs determined at S5, by the first correction coefficient Kvs1 determined at S26 and the second correction coefficient Kvs2 determined at S27 (Vs*=Vs×Kvs1×Kvs2). As shown in the control map of S26, first correction coefficient Kvs1 is decreased when a higher response speed is demanded to start the automatic deceleration control since the vehicle speed V approaches the limit speed VL rapidly and hence the turning speed difference variation ΔDV is increased. On the other hand, second correction coefficient Kvs2 is decreased when the vehicle speed becomes higher and a quick control response is demanded. Therefore, the control system can modify the base threshold Vs to a smaller threshold value adequately when a quick control response is desired, and thereby determine the modified threshold Vs* so as to increase the tendency to start the automatic deceleration control earlier.

At a step S29 next to S28, controller 5 compares the current turning radius R with the modified radius threshold Rs* determined at S25, and the current turning speed V with the modified speed threshold Vs* determined at S28. When at least one of the first condition (R<Rs*) and the second condition (V>Vs*) is met, then controller 5 proceeds to step S30 on the assumption that a preliminary brake pressure increase is appropriate. At S30, controller 5 determines, as a target brake fluid pressure Pi, a preliminary pressure increase quantity ΔP to increase the wheel cylinder brake fluid pressure for each wheel cylinder preliminarily. This preliminary pressure increase quantity ΔP is set at such a low pressure level (2~3 [bar], for example) as not to cause unnatural feelings to the driver with a vehicle deceleration produced by the preliminary pressure increase of the wheel cylinders 9i.

At a next step S31, controller 5 controls the brake actuating system 6 so as to make the brake pressure of each wheel cylinder 9i equal to the target Pi, and thereby performs the preliminary brake pressure increase by ΔP. After S31, controller 5 proceeds to a step S32.

When the automatic deceleration control is already started to achieve target deceleration Xg*, so that the brake pressures are already increased, and hence the automatic deceleration flag F is ON, then controller 5 proceeds from S21 directly to S32. When the answer of S29 is NO (R≧Rs* and V≦Vs*), too, controller 5 proceeds from S29 directly to S32 on the assumption that the preliminary brake pressure increase is not demanded.

At S32, controller 5 compares the current turning radius R with the base radius threshold Rs determined at S4, and the current turning speed V with the base speed threshold Vs determined at S5. When at least one of the first condition (R<Rs) and the second condition (V>Vs) is met, then controller 5 proceeds to step S33 on the assumption that the automatic deceleration control is to be effected. At S33, controller 5 calculates the target vehicle deceleration Xg* to achieve stable vehicle turning motion, in accordance with a deviation of turning radius R from the base threshold Rs, obtain by subtracting R from Rs, and a deviation of turning speed V from the base threshold Vs, obtained by subtracting Vs from V so that the target deceleration Xg* becomes higher as these deviations become greater. It is possible to use a know method for calculating target deceleration Xg*. At S33, controller 5 sets automatic deceleration flag F to ON (F=ON).

After S33, controller 5 enters a section of S12~S15; calculates the engine output decrease control quantity to achieve the target deceleration Xg* by the engine output control at S12; calculates the brake control is quantity to remedy a deficiency of the engine output decrease control at S13; calculates the target brake fluid pressure Pi at S14; and controls the brake actuator 6 and engine output control actuator 7 to achieve the target deceleration Xg* as in the steps S12~S15 of FIG. 3.

When the answer of S32 is NO (R≧Rs and V≦Rs), then controller 5 proceeds to a step S34 on the assumption that the automatic deceleration control is not required at this moment, and resets flag F to OFF (F=OFF). After S34, controller 5 returns to the main program.

Figure 8A:
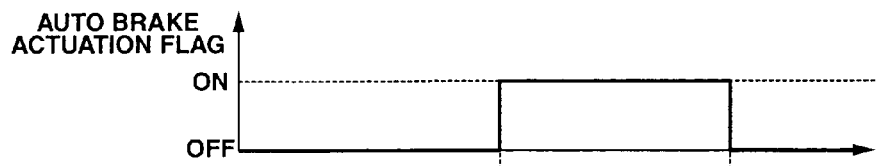
FIGS. 8A, 8B, 8C and 8D are timing chart illustrating operations of the turning motion control system according to the third embodiment.
Figure 8B:
Figure 8C:
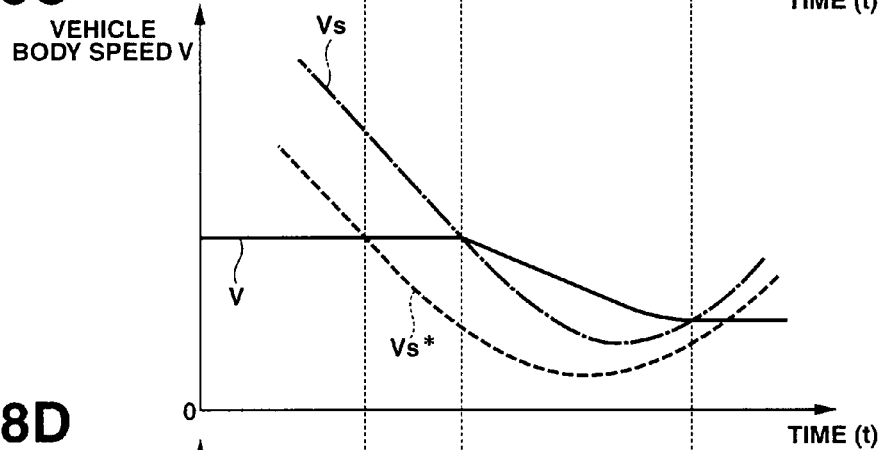
Figure 8D:
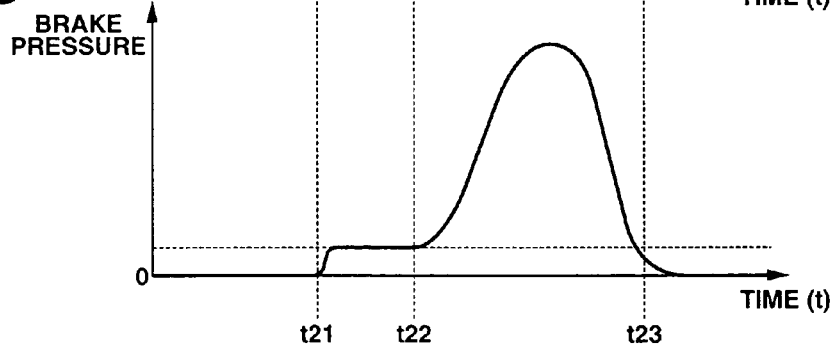

FIGS. 8A~8D illustrate operations of the control system according to the third embodiment in the form of time chart. FIG. 8A shows an auto brake actuation flag or automatic deceleration control flag indicating the actuation of the automatic deceleration control in the case of ON and indicating the non-actuation of the automatic deceleration control in the case of OFF. FIG. 8B shows a preliminary pressure increase flag indicating the actuation of the preliminary brake pressure increase control in the case of ON, and indicating the non-actuation of the preliminary brake pressure increase control in the case of OFF. FIG. 8C shows the vehicle body speed V, and FIG. 8D shows the wheel cylinder brake fluid pressure.

The control system according to the third embodiment calculates the base deceleration start thresholds Rs and Vs in accordance with the input information collected by the sensors (S1~S5); calculates the turning speed difference variation $\Delta DV$ (S22); sets the correction coefficients Krs1, Krs2, Kvs1 and Kvs2 in accordance with the turning speed difference $\Delta DV$ and the vehicle body speed V (S23, S24, S26, S27); and determines the modified (final) deceleration start thresholds Rs* and Vs* by using the base thresholds Rs and Vs and the correction coefficients Krs1, Krs2, Kvs1 and Kvs2 (S25, S28). Then, the control system determines whether to perform the preliminary pressure increase for the automatic deceleration control, by comparing the current actual turning radius R and the current actual vehicle speed V, respectively, with the modified radius threshold Rs* and the modified speed threshold Vs* (S29). When turning radius R is greater than or equal to Rs*, and at the same time the turning speed V is lower than or equal to Vs*, the control system considers that there is no need to perform the preliminary pressure increase, and proceeds directly to S32 for comparing the turning radius and turning speed with the respective base thresholds Rs and Vs. If turning radius R is greater than or equal to base radius threshold Rs, and at the same time the turning speed V is lower than or equal to the base speed threshold Vs, then the control system considers that there is no need to initiate the automatic deceleration control, and holds the automatic deceleration flag F equal to OFF at S34. In this state, therefore, the control system performs neither the preliminary pressure increase nor the deceleration control, so that the wheel cylinder pressure of each wheel cylinder 9i is held at zero level.

If the driver turns steering wheel 3a, and the vehicle turning radius R becomes smaller, then the base threshold Vs becomes lower, and the deceleration start threshold Vs* (determined from $\Delta DV$ and V) becomes lower, too. However, as long as the deceleration start threshold Vs* is still higher than vehicle body speed V, and the base threshold Vs is higher than body speed V, the control system does not perform the automatic deceleration control by taking the course of S29→S32→S34 on the assumption that the turning motion is within the stable region.

Then, the base threshold Vs decreases with the decrease of turning radius R, as shown by a one-dot chain line in FIG. 8C, and accordingly, the deceleration start threshold Vs* decreases as shown by a broken line in FIG. 8C. When body speed V exceeds deceleration start threshold Vs* at an instant t21, then the control system proceeds from S29 to S30, and controls the brake actuating system 6 to achieve the preliminary brake pressure increase $\Delta P$ at S31.

Therefore, as shown in FIG. 8D, the brake fluid pressure is increased slightly from t21, and held at the level corresponding to preliminary pressure increase $\Delta P$.

The control system continues to hold the brake pressure at this level without performing the automatic deceleration control of S33 and S12-S15 as long as V≦Vs and R≧Rs. When the turning speed V exceeds the base threshold Vs at an instant t22; the control system proceeds from S32 to S33; calculates the target vehicle deceleration Yg* desired for safer cornering performance, in accordance with the current turning radius R and turning speed V and the base thresholds Vs and Rs (S33); controls the engine output control actuator 7 to achieve target deceleration Yg* (S12, S15); and controls the brake control actuator 6 according to the need (S13, S14, S15). Moreover, the control system sets the automatic deceleration flag F to ON (F=ON)(S33).

Thus, the control system starts the automatic deceleration control at t22, and produce an actual deceleration corresponding to target deceleration Yg* by decreasing the engine output and supplementarily increasing the wheel cylinder pressure of each wheel cylinder 9i as shown in FIG. 8D. Therefore, vehicle body speed V becomes lower, as shown in FIG. 8C. The control system proceeds from S21 to S32 while the automatic deceleration flag F is ON, and continues the automatic deceleration control as long as the answer of S32 is YES (R<Rs or V>Vs).

The turning speed V is decreased by the automatic deceleration control, and the base speed threshold Vs tends to become higher as the vehicle cornering operation comes to an end. When the turning speed V becomes lower than base threshold Vs at an instant t23, then the control system considers that the vehicle enters the stable turning motion region, and terminates the automatic deceleration control by proceeding from S32 to S34, and resetting flag F to OFF.

Thus, the control system according to the third embodiment preliminarily increases the brake pressure to $\Delta P$ at t21 as shown by the solid line in FIG. 8D, prior to the start of the automatic deceleration control at t22, and thereby improves the response of the hydraulic brake actuating system at the time of starting the automatic deceleration control at t22. Since the pressure level of $\Delta P$ is set at such a very low level as not to cause a sense of discomfort to the driver, the control system can start an increase of the brake pressure quickly at a proper timing without deteriorating the driving quality.

As shown in the control maps of S23, S24, S26 and S27 of FIG. 7, the deceleration start thresholds Vs* and Rs* for determining the start timing of starting the preliminary brake pressure increase control are calculated in accordance with the variation ($\Delta DV$) of the turning speed difference (VL–V), and the turning speed. When the variation of turning speed difference is greater and the vehicle turning speed tends to approach the limit VL rapidly, the demand for quicker initial response is greater. Similarly, the demand for quicker initial response is greater when the vehicle turning speed V is higher. When the demand for quicker initial response is greater, the control system according to the third embodiment sets the deceleration start thresholds Vs* and Rs* so as to lower the barriers to be surpassed by the turning speed V and turning radius R to start the initial control action. By so doing, the control system can ensure the satisfactory initial response speed in accordance with the running state of the so vehicle.

When the speed difference variation $\Delta DV$ is smaller and the vehicle turning speed V is lower, the control system holds the correction coefficients Krs1, Krs2, Kvs1 and Kvs2 equal to one, and does not perform the modification of the base thresholds Rs and Vs. Accordingly, the control system does not perform the preliminary brake pressure increase control uselessly, and thereby improves the durability of the brake control actuator 6 and other components. In the greater speed difference variation region or the higher vehicle speed region, the correction coefficients are held constant with no further adjustment so as to prevent the timing of starting the preliminary brake pressure increase control from being advanced excessively.

In the practical example shown in FIG. 7, the deceleration start thresholds Vs* and Rs* are adjusted in accordance with both the turning speed difference variation ΔDV and the vehicle turning speed V. However it is optional to vary the deceleration start thresholds Vs* and Vs* in dependence on only either one of the turning speed difference variation ΔDV and the vehicle turning speed V. Moreover, it is possible to vary the deceleration start thresholds Vs* and Vs* used in S29 of FIG. 7 by using any one or more of the yaw rate variation Δφ as shown in FIG. 3 of the first embodiment, the lateral acceleration variation ΔYg as shown in FIG. 6 of the second embodiment, the turning speed difference variation ΔDV as shown in FIG. 7 of the third embodiment, the vehicle turning speed V as shown in FIG. 7 of the third embodiment, the steering angle variation Δθ, and the left and right wheel speed difference.

The brake actuating system 6 shown in FIG. 2 is a hydraulic brake actuating system, so-called pump-up system, employing the motor pump. The present invention is not limited to this. For example, the brake actuating system 6 may be a brake-by-wire system employing an electric actuator arranged to press a friction pad against a brake rotor rotating with a wheel.

According to one of various s possible constructions, in the examples of FIG. 3 and FIG. 6, S2 and S3 can correspond to a turning condition sensing section; S10~S15 can correspond to a vehicle deceleration control section; S6 or S6a can correspond to a running state sensing section; and S4, S5, S7, S8, S7a, S8a, S9 can correspond to a threshold setting section. In the example of FIG. 7, according to one of various s possible constructions, S2 and S3 can correspond to a turning condition sensing section; S29, S30, S31, S32, S33 and S12~S15 can correspond to a vehicle deceleration control section; S22 can correspond to a running state sensing section; and S4, S5, S21, and S23-S28 can correspond to a threshold setting section.

This application is based on a prior Japanese Patent Application No. 2004-167915 filed on Jun. 7, 2004. The entire contents of this Japanese Patent Application No. 2004-167915 are hereby incorporated by reference.

Although the invention has been described above by reference to certain embodiments of the invention, the so invention is not limited to the embodiments described above. Modifications and variations of the embodiments described above will occur to those skilled in the art in light of the above teachings. The scope of the invention is defined with reference to the following claims.

What is claimed is:

1. A vehicle turning motion control apparatus for a vehicle, comprising:
   a turning condition sensing section configured to sense a turning condition of the vehicle;
   a vehicle deceleration control section configured to initiate a deceleration control to decelerate the vehicle when the turning condition surpasses a deceleration start threshold;
   a running state sensing section configured to sense a running state of the vehicle and to determine an absolute value of a variation of the running state; and
   a threshold setting section configured to set the deceleration start threshold in accordance with the absolute value of the variation of the running state when the vehicle enters a turning state, wherein the threshold setting section is configured to determine a base threshold from a turning ability limit defining a limit of a stable vehicle turning performance region, and to determine the deceleration start threshold by modifying the base threshold in accordance with the absolute value of the variation of the running state; wherein:
   the turning condition is a turning radius of the vehicle;
   the deceleration start threshold is a deceleration start turning radius threshold to be compared with the turning radius;
   the base threshold is a base turning radius threshold;
   the vehicle deceleration control section is configured to initiate the deceleration control to decelerate the vehicle when the turning radius of the vehicle becomes smaller than the deceleration start turning radius threshold; and
   the threshold setting section is configured to determine the base turning radius threshold from the turning ability limit defining the limit of the stable vehicle turning performance region, and to determine the deceleration start turning radius threshold by modifying the base turning radius threshold in accordance with the absolute value of the variation of the running state of the vehicle; and
   wherein the threshold setting section is configured to determine the turning ability limit which includes a limit turning radius defining the limit of the stable vehicle turning performance region in accordance with a vehicle speed of the vehicle, and to determine the base radius threshold by multiplying the limit turning radius by a predetermined coefficient which is greater than one.

2. The vehicle turning motion control apparatus as claimed in claim 1, wherein the running state sensing section is configured to ascertain a yaw rate of the vehicle and to determine an absolute value of a variation of the yaw rate, and the threshold setting section is configured to vary the deceleration start threshold in a direction to advance a deceleration start timing to initiate the deceleration control by the deceleration control section when the absolute value of the variation of the yaw rate increases, both when the yaw rate is increasing and when the yaw rate is decreasing, and further configured to determine the deceleration start threshold by modifying the base threshold in accordance with the absolute value of the variation of the yaw rate of the vehicle.

3. The vehicle turning motion control apparatus as claimed in claim 1, wherein the running state sensing section is configured to ascertain a lateral acceleration of the vehicle and to determine an absolute value of a variation of the lateral acceleration, and the threshold setting section is configured to vary the deceleration start threshold in a direction to advance a deceleration start timing to initiate the deceleration control by the deceleration control section as the absolute value of the variation of the lateral acceleration increases, and further configured to determine the deceleration start threshold by modifying the base threshold in accordance with the absolute value of the variation of the lateral acceleration of the vehicle.

4. The vehicle turning motion control apparatus as claimed in claim 1, wherein the running state sensing section is configured to ascertain a speed difference between a vehicle body speed of the vehicle and a limit turning speed, and to determine an absolute value of a variation of the speed difference, and the threshold setting section is configured to vary the deceleration start threshold in a direction to advance a deceleration start timing to initiate the deceleration control by the deceleration control section as the absolute value of the variation of the speed difference increases, and further configured to determine the deceleration start threshold by modifying the base threshold in accordance with the absolute value of the variation of the speed difference.

5. The vehicle turning motion control apparatus as claimed in claim 1, wherein the running state sensing section is configured to ascertain a vehicle body speed of the vehicle, and the threshold setting section is configured to vary the deceleration start threshold in a direction to advance a deceleration start timing to initiate the deceleration control by the deceleration control section as the vehicle body speed becomes higher.

6. The vehicle turning motion control apparatus as claimed in claim 5, wherein the threshold setting section is configured to determine the deceleration start threshold by modifying the base threshold in accordance with the running state of the vehicle so as to advance the deceleration start timing when the vehicle body speed is in a higher vehicle speed region, and by setting the deceleration start threshold equal to the base threshold in a lower vehicle speed region.

7. The vehicle turning motion control apparatus as claimed in claim 1, wherein the vehicle deceleration control section is configured to perform a preliminary deceleration control operation during a period from a time when the turning condition surpasses the deceleration start threshold to a time when the turning condition surpasses the base threshold.

8. The vehicle turning motion control apparatus as claimed in claim 1, wherein the vehicle deceleration control section comprises a hydraulic brake system, and the threshold setting section is configured to vary the deceleration start threshold so as to compensate for a delay in brake pressure rise in the hydraulic brake system by advancing a deceleration start timing to initiate the deceleration control in accordance with the running state.

9. The vehicle turning motion control apparatus as claimed in claim 1,
wherein the turning condition sensing section is configured to determine, as a parameter representing the turning condition, a first turning motion variable representing an actual turning radius of the vehicle, and a second turning motion variable representing an actual turning speed of the vehicle;
wherein the vehicle deceleration control section is configured to initiate the deceleration control to decelerate the vehicle when at least one of first and second conditions is met, the first condition being a condition which is met when the actual turning radius of the vehicle becomes smaller than the deceleration start turning radius threshold, the second condition being a condition which is met when the actual turning speed of the vehicle becomes higher than a deceleration start turning speed threshold; and
wherein the threshold setting section is configured to set the turning radius threshold and the turning speed threshold in accordance with the absolute value of the variation of the running state by using the absolute value of the variation of the running state to calculate the turning radius threshold and the turning speed threshold.

10. The vehicle turning motion control apparatus as claimed in claim 1, wherein the threshold setting section is configured to determine a correction coefficient for correcting the base turning radius threshold, in accordance with the absolute value of the variation of the running state of the vehicle and to multiply the base turning radius threshold by the correction coefficient, to determine the deceleration start turning radius threshold.

11. The vehicle turning motion control apparatus as claimed in claim 10, wherein the threshold setting section is configured to increase the correction coefficient for correcting the base turning radius threshold with an increase in the absolute value of the variation of the running state of the vehicle and to multiply the base turning radius threshold by the correction coefficient to determine the deceleration start turning radius threshold.

12. The vehicle turning motion control apparatus as claimed in claim 11, wherein the threshold setting section is configured to:
increase the correction coefficient for correcting the base turning radius threshold from a smaller coefficient value to a greater coefficient value when the absolute value of the variation of the running state of the vehicle increases from a smaller variation value to a greater variation value which is greater than the smaller variation value;
set a correction coefficient for correcting a base turning radius threshold constant at the smaller coefficient value when the absolute value of the variation of the running state is smaller than the smaller variation value; and
set the correction coefficient for correcting the base turning radius threshold constant at the greater coefficient value when the absolute value of the variation of the running state is greater than the greater variation value.

13. A vehicle turning motion control process for a vehicle, the vehicle turning motion control process comprising:
sensing a turning condition of the vehicle;
decelerating the vehicle by initiating a deceleration control when the turning condition surpasses a deceleration start threshold;
sensing a running state of the vehicle;
determining an absolute value of a variation of the running state; and
setting the deceleration start threshold in accordance with the absolute value of the variation of the running state when the vehicle enters a turning state,
wherein the deceleration start threshold is determined by determining a base threshold from a turning ability limit defining a limit of a stable vehicle turning performance region, and determining the deceleration start threshold by modifying the base threshold in accordance with the absolute value of the variation of the running state of the vehicle, wherein:
the turning condition is a turning radius of the vehicle,
the deceleration start threshold is a deceleration start turning radius threshold,
the base threshold is a base turning radius threshold,
the deceleration control is initiated to decelerate the vehicle when the turning radius of the vehicle becomes smaller than the deceleration start turning radius threshold,
the base turning radius threshold is determined from the turning ability limit defining the limit of the stable vehicle turning performance region, and
the deceleration start turning radius threshold is determined by modifying the base turning radius threshold in accordance with the absolute value of the variation of the running state of the vehicle, and
wherein the turning ability limit, which includes a limit turning radius defining the limit of the stable vehicle turning performance region, is determined in accordance with a speed of the vehicle, and the base radius threshold is determined by multiplying the limit turning radius by a predetermined coefficient which is greater than one.

14. A vehicle turning motion control apparatus for a vehicle, the vehicle turning motion control apparatus comprising:

means for sensing a turning condition which includes a turning radius of the vehicle;

means for comparing the turning radius with a deceleration start turning radius threshold, and initiating a deceleration control to decelerate the vehicle automatically when the turning radius becomes smaller than the deceleration start turning radius threshold;

means for sensing a running state of the vehicle and for determining an absolute value of a variation of the running state; and means for setting the deceleration start turning radius threshold in accordance with the absolute value of the variation of the running state by using the absolute value of the variation of the running state to calculate the deceleration start turning radius threshold; wherein:

the setting means includes a means for determining a base turning radius threshold from a turning ability limit defining a limit of a stable vehicle turning performance region, and for determining the deceleration start turning radius threshold by modifying the base turning radius threshold in accordance with the absolute value of the variation of the running state of the vehicle by using the absolute value for the variation of the running state to calculate the deceleration start turning radius threshold; and wherein the setting means includes a means for determining the turning ability limit which includes a limit turning radius defining the limit of the stable vehicle turning performance region in accordance with a vehicle speed of the vehicle, and the means for determining the base radius threshold multiplies the limit turning radius by a predetermined coefficient which is greater than one.

* * * * *